(12) United States Patent
Wade et al.

(10) Patent No.: US 7,125,607 B2
(45) Date of Patent: Oct. 24, 2006

(54) POLYMER SHEETS AND METHODS OF CONTROLLING ADHESION OF POLYMER SHEETS TO GLASS

(75) Inventors: Bruce Edward Wade, West Springfield, MA (US); John Joseph D'Errico, Glastonbury, CT (US); Helen Mackin Thompson, Somers, CT (US); Michael Kin-kui Yu, Ludlow, MA (US)

(73) Assignee: Solutia Incorporated, St. Louis, MO (US)

( * ) Notice: Subject to any disclaimer, the term of this patent is extended or adjusted under 35 U.S.C. 154(b) by 317 days.

(21) Appl. No.: 10/801,052

(22) Filed: Mar. 16, 2004

(65) Prior Publication Data

US 2005/0208315 A1 Sep. 22, 2005

(51) Int. Cl.
*B32B 17/10* (2006.01)
*C08K 5/098* (2006.01)

(52) U.S. Cl. .................. 428/437; 524/394; 524/400

(58) Field of Classification Search ............. 428/437; 524/394, 400
See application file for complete search history.

(56) References Cited

U.S. PATENT DOCUMENTS

| | | | |
|---|---|---|---|
| 2,282,026 A | 5/1942 | Bozetech et al. |
| 2,282,057 A | 5/1942 | Hopkins et al. |
| 2,496,480 A | 2/1950 | Lavin et al. |
| 3,271,235 A | 9/1966 | Lavin et al. |
| 4,391,867 A | 7/1983 | Derick et al. |
| 4,952,457 A | 8/1990 | Cartier et al. |
| 4,968,743 A | 11/1990 | Misra et al. |
| 4,968,744 A | 11/1990 | Misra et al. |
| 4,968,745 A | 11/1990 | Misra et al. |
| 4,970,253 A | 11/1990 | Hermann et al. |
| 4,999,078 A | 3/1991 | Misra et al. |
| 4,999,253 A | 3/1991 | Misra et al. |
| 5,069,942 A | 12/1991 | Anderson |
| 5,367,015 A | 11/1994 | Gutweiler et al. |
| 5,425,879 A | 6/1995 | Hayes |
| 5,427,861 A | 6/1995 | D'Errico |
| 5,434,207 A | 7/1995 | Fischer |
| 5,728,472 A | 3/1998 | D'Errico |
| 5,886,075 A | 3/1999 | Keane et al. |
| 6,178,034 B1 | 1/2001 | Allemand et al. |
| 6,387,516 B1 | 5/2002 | Shichiri et al. |
| 6,673,456 B1 | 1/2004 | Kobata et al. |
| 2003/0044611 A1 | 3/2003 | Stark et al. |
| 2003/0111159 A1 | 6/2003 | Hashimoto et al. |
| 2003/0166788 A1 | 9/2003 | Papenfuhs |

FOREIGN PATENT DOCUMENTS

| | | |
|---|---|---|
| EP | 89870197.4 | 6/1990 |
| FR | 1487497 | 7/1967 |
| WO | WO 2004/011538 A2 | 2/2004 |

OTHER PUBLICATIONS

Wade, B.E., *Vinyl Acetyl Polymers*, Encyclopedia of Polymer Science and Technology 3rd edition, 2003, pp. 381-399, vol. 8.

*Primary Examiner*—D. S. Nakarani
(74) *Attorney, Agent, or Firm*—Brenc Law

(57) ABSTRACT

The present invention is in the field of polymer sheets comprising poly(vinyl butyral) and sodium acetate and methods of producing and using the same, and more specifically, the present invention is in the field of polymer sheets comprising plasticized poly(vinyl butyral), sodium acetate, and an adhesion control agent.

21 Claims, No Drawings

POLYMER SHEETS AND METHODS OF CONTROLLING ADHESION OF POLYMER SHEETS TO GLASS

FIELD OF THE INVENTION

The present invention is in the field of polymer sheets comprising poly(vinyl butyral) and sodium acetate and methods of producing and using the same, and more specifically, the present invention is in the field of polymer sheets comprising poly(vinyl butyral), sodium acetate, and an adhesion control agent.

BACKGROUND

Poly(vinyl butyral) (PVB) is commonly used in the manufacture of polymer sheets that can be used as interlayers in light-transmitting laminates such as safety glass or polymeric laminates. Safety glass typically refers to a transparent laminate comprising a poly(vinyl butyral) sheet disposed between two panes of glass. Safety glass often is used to provide a transparent barrier in architectural and automotive openings. Its main function is to absorb energy, such as that caused by a blow from an object, without allowing penetration through the opening. Additives to the sheet formulation generally include at least one adhesion control agent (hereinafter, "ACA") to modify adhesion of the sheet to the glass so that a suitable level of adhesion can be maintained to prevent spalling of the glass while still providing adequate energy absorption if an impact occurs.

Safety glass can be formed by a process in which two layers of glass and a plastic interlayer, such as poly(vinyl butyral), are assembled into a pre-press, tacked into a pre-laminate, and finished into an optically clear laminate. The assembly phase can involve laying down a piece of glass, overlaying a poly(vinyl butyral) sheet on that glass, laying down a second piece of glass on the poly(vinyl butyral) sheet, and then trimming the excess poly(vinyl butyral) to the edges of the glass layers.

The plastic interlayer can be produced by mixing poly (vinyl butyral) polymer with one or more plasticizers, and optionally with one or more other ingredients, and melt processing the mix into sheeting, which typically is collected and rolled for storage and transportation.

The process of fabricating poly(vinyl butyral) resin can entail the use of acids to catalyze the formation of a vinyl acetal from vinyl alcohol and aldehyde precursors. After formation of the acetal, the acids can be neutralized using an appropriate base. This process will typically leave residual acetate trapped within the poly(vinyl butyral) resin, which can impact both stabilization and adhesion qualities. The residual concentration of the acetate, however, can be a limiting factor when certain adhesion and other characteristics are desired in the finished poly(vinyl butyral).

Accordingly, further improved compositions and methods are needed to enhance the characteristics of polymer and poly(vinyl butyral) sheets, and specifically poly(vinyl butyral) sheets, without adversely affecting the resulting polymer sheet.

SUMMARY OF THE INVENTION

Now, according to the present invention, polymer sheets have been developed comprising poly(vinyl butyral) and sodium acetate, and more specifically, polymer sheets have been developed comprising poly(vinyl butyral) containing sodium acetate and an adhesion control agent.

The present invention includes a polymer sheet, comprising: plasticized poly(vinyl butyral); sodium acetate; and, a magnesium salt, wherein the titer of said magnesium salt is at least 4, wherein the alkalinity titer attributable to said sodium acetate is at least 20, and wherein the ratio of said titer of said magnesium salt to the total alkalinity titer is at least 0.2.

The present invention includes a polymer sheet, comprising: plasticized poly(vinyl butyral); sodium acetate; potassium acetate; and, a magnesium salt, wherein the titer of said magnesium salt is at least 9.0, wherein the total alkalinity titer is at least 20, wherein the ratio of said titer of said magnesium salt to said total alkalinity titer is at least 0.2, and wherein the ratio of parts per million of potassium to parts per million of sodium is less than 1.0.

The present invention includes a method of manufacturing a polymer sheet, comprising: forming a poly(vinyl butyral) resin, wherein said resin comprises sodium acetate and a magnesium salt; adding a plasticizer to said resin to form a melt; and, forming said polymer sheet with said melt, wherein the titer of said magnesium salt is at least 4, wherein the alkalinity titer attributable to said sodium acetate is at least 20, and wherein the ratio of said titer of said magnesium salt to the total alkalinity titer is at least 0.2.

The present invention includes a laminated glass panel, comprising: a glass panel; and, a polymer sheet, wherein said polymer sheet comprises: plasticized poly(vinyl butyral); sodium acetate; and, a magnesium salt, wherein the titer of said magnesium salt is at least 4, wherein the alkalinity titer attributable to said sodium acetate is at least 20, and wherein the ratio of said titer of said magnesium salt to the total alkalinity titer is at least 0.2.

DETAILED DESCRIPTION

According to the present invention, it has been discovered that sodium acetate, which functions as both a stabilizer and an adhesion control agent, is a weaker adhesion control agent than potassium acetate. This surprising result allows a proportionally greater amount of sodium acetate to be used in polymer sheets relative to potassium acetate. In various embodiments of the present invention, relatively high titers of sodium acetate are used to produce products having improved yellowness indices and improved resistance to edge delamination under certain conditions without also adversely affecting the pummel value of the finished product.

Further, increased amounts of sodium acetate can be used to replace, in whole or in significant part, the conventional potassium acetate component of many laminated glass interlayers. These results are especially desirable in polymer interlayers that also contain magnesium salt adhesion control agents, because, conventionally, the amount of potassium acetate that could be used to produce a product with a given set of specifications was dependent in part upon the amount of magnesium salt that was used. As described herein throughout, the present invention provides embodiments in which sodium acetate is used to eliminate or reduce the amount of potassium acetate while not concurrently requiring a decrease in magnesium salt, and, in some embodiments, allowing an increase in magnesium salt.

Poly(vinyl butyral), as well as other vinyl acetals, can be manufactured by various methods, as is known in the art. Two methods that have been employed are the solvent process and the aqueous process (see, for example, Vinyl Acetal Polymers, in Encyclopedia of Polymer Science & Technology, 3$^{rd}$ edition, Volume 8, pages 381–399, by B. E.

Wade (2003)). In either method, poly(vinyl alcohol) is reacted with an aldehyde in the presence of mineral or organic acid catalysts to produce a poly(vinyl acetal) and water. If butyraldehyde is used as the aldehyde, then the resulting acetal is poly(vinyl butyral).

Any suitable acids may be used and will generally include a primary acid catalyst and acetic acid. In various embodiments of methods of the present invention, sulfuric acid is used as the primary acid catalyst.

After acetal formation in either of the above methods, neutralization of the residual acids can be accomplished by, for example, the addition of a hydroxide compound. As disclosed in U.S. Pat. Nos. 5,728,472 and 3,271,235, for example, either sodium hydroxide or potassium hydroxide can be used to neutralize the acids. The use of either of these hydroxides can result in a residual titer of the acetate salts within the polymer matrix (see, for example, U.S. Pat. No. 2,496,480). This residual titer is generally desirable because it prevents the degradation of the finished polymer because of the detrimental action of residual oxides of sulfur (if sulfuric acid is used as the primary acid catalyst, for example).

The use of potassium hydroxide as a neutralizing agent has the additional impact on the finished poly(vinyl butyral) of affecting the adhesiveness of the polymer, for example, to glass. This adhesiveness of the finished polymer sheet can be modified further by the inclusion of multivalent, metal-substituted aromatic, optionally chelating compounds, such as magnesium salts.

The present invention relates to the unexpected result that high levels of sodium acetate, relative to a mole equivalent amount of potassium acetate, produces a polymer sheet that is more adhesive to glass under various conditions. The present invention therefore includes polymeric sheets having a relatively high titer of sodium acetate, as well as methods for making those polymeric sheets, and methods of controlling adhesiveness in those polymeric sheets by increasing the amount of sodium acetate in the finished product.

In various embodiments, the present invention includes a polymer sheet, comprising: plasticized poly(vinyl butyral) and sodium acetate at a titer sufficient to impart the desired adhesiveness to the polymer sheet. In various embodiments, the alkalinity titer attributable to sodium acetate in the polymer sheet is at least 25, at least 30, at least 35, at least 37, at least 40, at least 43, at least 46, or at least 50. In various embodiments, sodium is present in the finished polymer sheet at at least 100 ppm, at least 120 ppm, at least 140 ppm, at least 150 ppm, or at least 160 ppm on a poly(vinyl butyral) resin basis. In these embodiments, potassium and potassium acetate can occur as insubstantial components.

In other embodiments of the present invention, both sodium acetate and a magnesium salt are used as ACAs in a polymer sheet. In these embodiments, the decreased adhesion control of sodium acetate optionally allows the use of a relatively greater amount of sodium acetate and/or a magnesium salt to achieve the desired adhesiveness of the final product. This result is particularly desirable in applications such as windshields, in which conventional potassium acetate and magnesium salt concentrations in the final product can lead to edge delamination under high temperature and high moisture conditions. Sheet formulations can be optimized with higher magnesium salt concentrations for better edge stability for medium to high adhesion and a higher total alkaline titer level.

Specifically, in embodiments comprising both sodium acetate and a magnesium salt, the ratio of the titer of the magnesium salt to total alkaline titer can be at least 0.2, at least 0.3, at least 0.4, at least 0.5, at least 0.75, at least 1.0, or at least 1.2, where the titer of the magnesium salt (determined as defined below) can be at least 4, at least 8, at least 12, at least 16, at least 20, or at least 24 and where the alkaline titer attributable to sodium acetate (determined as defined below) can be at least 20, at least 30, at least 40, at least 50, at least 60, at least 70, or at least 80. These embodiments can have no potassium acetate, or be substantially free of potassium acetate (less than 5 alkaline titer attributable to potassium acetate).

As used herein, "alkaline titer attributable to sodium acetate" means the portion of the total alkaline titer that is the result of the acid neutralization effect of sodium acetate. Likewise, "alkaline titer attributable to potassium acetate" refers to the portion of the total alkaline titer that is the result of the acid neutralization effect of potassium acetate. Determination of these proportions is described below.

In other embodiments of the present invention, in addition to sodium acetate and a magnesium salt, polymer sheets can comprise a not insubstantial amount of potassium acetate. In these embodiments, potassium acetate and sodium acetate both function as adhesion control agents and stabilizers and the ratio of the titer of the magnesium salt to the total alkaline titer can be at least 0.2, at least 0.3, at least 0.4, at least 0.5, at least 0.75, at least 1.0, or at least 1.2, where the titer of the magnesium salt (determined as defined below) can be at least at least 4, at least 8, at least 12, at least 16, at least 20, or at least 24 and where the total alkaline titer (determined as defined below) can be at least 20, at least 30, at least 40, at least 50, at least 60, at least 70, or at least 80, and where the ratio of potassium to sodium, measured in parts per million (ppm), can be less than 1.0, less than 0.8, less than 0.6, less than 0.4, or less than 0.2.

Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate). The ppm, titer, and ratios given elsewhere herein for magnesium salt can be specifically applied to each of the magnesium salts listed above, and particularly for magnesium bis(2-ethyl butyrate) (chemical abstracts number 79992-76-0). In various embodiments of the present invention the magnesium salt is magnesium bis(2-ethyl butyrate).

As used herein, a "polymer sheet" means any polymer composition formed by any suitable method into a thin layer that is suitable for use as an interlayer in laminated glass structures.

In various embodiments, the present invention includes a method of manufacturing a polymer sheet, comprising: forming a poly(vinyl butyral) resin, wherein said resin comprises any of the combinations of sodium acetate, magnesium salt, and optionally potassium acetate, adding a plasticizer to the resin to form a melt, and forming the polymer sheet with the melt, wherein the polymer sheet has any of the combinations of the components given herein throughout. In a specific embodiment, the method comprises forming a poly(vinyl butyral) resin, wherein said resin comprises sodium acetate and a magnesium salt; adding a plasticizer to said resin to form a melt; and, forming said polymer sheet with said melt, wherein the titer of said magnesium salt is at least 4, wherein the alkalinity titer attributable to said sodium acetate is at least 20, and wherein the ratio of said titer of said magnesium salt to total alkalinity titer is at least 0.2.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a melted mixture of resin with a plasticizer and optionally other additives.

In addition to the specific embodiment given above, the above method can also be used to produce any of the polymer sheets given elsewhere herein that comprise both a magnesium salt and sodium acetate, and optionally potassium acetate, in the ranges for those components given elsewhere herein. Further, other components, as is known in the art and described elsewhere herein, can be added to the polymer sheet during processing to achieve the desired final product.

In any of the methods of the present invention given herein, sodium acetate and/or potassium acetate can be added to the polymer resin after neutralization of the acids. This technique can be used, for example, when it is desired to raise the titer or concentration of sodium acetate higher than the level produced by the neutralization process.

For any of the polymer sheets of the present invention, potassium hydroxide can be used in addition to sodium hydroxide for the neutralization process, and potassium acetate and/or sodium acetate can be added separately after the neutralization process, if desired.

Polymer sheets made by the processes disclosed herein are part of the present invention and are included within the scope of the invention.

The polymer sheets of the present invention can comprise any suitable polymer, and, in a preferred embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, poly(vinyl chloride), poly(ethylene-co-vinyl acetate), poly(ethylene terephthalate), combinations thereof, such as blends and composite structures, and the like. In one embodiment, the polymer sheet comprises poly(vinyl butyral). In other embodiments, the polymer sheet comprises plasticized poly(vinyl butyral). In further embodiments the polymer sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers, polymer composites, and polymer blends disclosed herein as useful as components in polymer sheets.

For embodiments comprising poly(vinyl butyral), the poly(vinyl butyral) can be produced by known acetalization processes that involve reacting poly(vinyl alcohol) with butyraldehyde in the presence of an acid catalyst, followed by neutralization of the catalyst, separation, stabilization, and drying of the resin.

In various embodiments, the polymer sheet comprising poly(vinyl butyral) comprises 10 to 35 weight percent (wt. %) hydroxyl groups calculated as PVOH, 13 to 30 wt. % hydroxyl groups calculated as PVOH, or 15 to 22 wt. % hydroxyl groups calculated as PVOH. The polymer sheet can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954) or acetaldehyde.

In various embodiments, the polymer sheet comprises poly(vinyl butyral) having a molecular weight greater than 30,000, 40,000, 50,000, 55,000, 60,000, 65,000, 70,000, 120,000, 250,000, or greater than 350,000 grams per mole (g/mole or Daltons). Small quantities of a dialdehyde or trialdehyde can also be added during the acetalization step to increase molecular weight to greater than 350 g/m (see, for example, U.S. Pat. Nos. 4,902,464; 4,874,814; 4,814,529; 4,654,179) As used herein, the term "molecular weight" means the weight average molecular weight. Any suitable method can be used to produce the polymer sheets of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381–399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

Additives may be incorporated into the polymer sheet to enhance its performance in a final product. Such additives include, but are not limited to, plasticizers, dyes, pigments, stabilizers (e.g., ultraviolet stabilizers), antioxidants, flame retardants, IR adsorbers, combinations of the foregoing additives, and the like, as are known in the art.

In various embodiments of polymer sheets of the present invention, the polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of 40° C. or less, 35° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779. and $C_6$ to $C_8$ adipate esters, such as hexyl adipate.

The poly(vinyl butyral) polymer and plasticizer additives can be thermally processed and configured into sheet form according to methods known to those of ordinary skill in the art. One exemplary method of forming a poly(vinyl butyral) sheet comprises extruding molten poly(vinyl butyral) comprising resin, plasticizer, and additives (hereinafter "melt") by forcing the melt through a sheet die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In either embodiment, the surface texture at either or both sides of the sheet may be controlled by adjusting the surfaces of the die opening or by providing texture at the roller surface. Other techniques for controlling the sheet texture include varying parameters of the materials (for example, the water content of the resin and/or the plasticizer, the melt temperature, molecular weight distribution of the poly(vinyl butyral), or combinations of the foregoing parameters). Furthermore, the sheet can be configured to include spaced projections that define a temporary surface irregularity to facilitate the de-airing of the sheet during lamination processes after which the elevated temperatures and pressures of the laminating process cause the projections to melt into the sheet, thereby resulting in a smooth finish. In various embodiments, the polymer sheets can have thicknesses of 0.1 to 2.5 millimeters, 0.2 to 2.0 millimeters, 0.25 to 1.75 millimeters, and 0.3 to 1.5 millimeters (mm).

Also included in the present invention are stacks or rolls of any of the polymer composition sheets of the present invention disclosed herein in any combination.

Also included in the present invention are methods of making windshields and other laminated glass products, comprising the steps of disposing a polymer sheet of the present invention between two layers of glass and laminating the three layer stack.

Further, the present invention includes a laminated safety glass comprising a layer of glass, typically comprising silicon dioxide, disposed in contact with any of the polymer sheets of the present invention. Further included is a laminated safety glass comprising at least two sheets of glass with an interlayer polymer sheet disposed therebetween, wherein the polymer sheet is any of the polymer sheets disclosed herein as embodiments of the present invention.

The present invention also includes windshields, windows, and other finished glass products comprising a polymer sheet of the present invention.

Various polymer sheet and/or laminated glass characteristics and measuring techniques will now be described for use with the present invention.

The clarity of a polymer sheet, and particularly a poly(vinyl butyral) sheet, can be determined by measuring the haze-value, which is a quantification of light not transmitted through the sheet. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: Transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness.

As used herein, "titer" can be determined for sodium acetate and potassium acetate (as used herein, the "total alkaline titer") and magnesium salts in a sheet sample using the following method.

In order to determine the amount of resin in each sheet sample that is weighed, the following equation is used, where PHR is defined as the pounds per hundred pounds of resin including plasticizer and any other additives to the resin in the original sheet sample preparation.

$$\text{Grams of resin in sheet sample} = \frac{\text{Grams sheet sample}}{(100 + PHR)/100}$$

Approximately 5 g of resin in the sheet sample is the target mass used to estimate the amount of sheet sample to start with, with the calculated mass of resin in the sheet sample used for each titer determination. All titrations should be completed in the same day.

The sheet sample is dissolved into 250 mls of methanol in a beaker. It may take up to 8 hours for the sheet sample to be completely dissolved. A blank with just methanol is also prepared in a beaker. The sample and blank are each titrated with 0.00500 normal HCl using an automated pH titrator programmed to stop at a pH of 2.5. The amount of HCl added to each the sample and the blank to obtain a pH of 4.2 is recorded. The HCl titer is determined according to the following:

$$\text{HCl Titer [mls 0.01 N HCl/100 g resin]} = \frac{50 \times (\text{mls of HCl for sample} - \text{mls of HCl for blank})}{\text{Calculated grams of resin}}$$

To determine magnesium salt titer, the following procedure is used:

12 to 15 mls of pH 10.00 Buffer solution, prepared from 54 grams of ammonium chloride and 350 mls of ammonium hydroxide diluted to one liter with methanol, and 12 to 15 mls of Erichrome Black T indicator are added to the blank and each sheet sample, all of which have already been titrated with HCR, as described above. The titrant is then changed to a 0.000298 g/ml EDTA solution prepared from 0.3263 g tetrasodium ethylenediaminetetraacetate dihydrate, 5 ml water, diluted to one liter with methanol. The EDTA titration is measured by light transmittance at 596 nm. The % transmittance is first adjusted to 100% in the sample or blank before the titration is started while the solution is a bright magenta-pink color. When transmittance at 596 nm becomes constant, the EDTA titration is complete, and the solution will be a deep indigo color. The volume of EDTA titrated to achieve the indigo blue end point is recorded for the blank and each sheet sample. Magnesium salt titer is determined according to the following:

$$\begin{array}{l}\text{Magnesium Salt Titer}\\ \text{[as } 1 \times 10^{-7} \text{ mole of}\\ \text{magnesium salt per gram resin]}\end{array} = \frac{\begin{array}{l}0.000298 \text{ g/ml } EDTA \times\\ (\text{mls of } EDTA \text{ for sample} -\\ \text{mls of } EDTA \text{ for blank})\end{array}}{\begin{array}{l}(\text{grams of resin in sheet sample}) \times\\ 380.2 \text{ g/mole } EDTA \times 0.0000001\end{array}}$$

From this result, total alkaline titer, as $1 \times 10^{-7}$ mole of acetate salt per gram resin, can be calculated according to the following:

Total Alkaline Titer=HCl titer of sheet−(2×Total Magnesium Salt Titer)

The portion of the total alkalinity titer attributable to either sodium acetate or potassium acetate can be determined by first determining the total alkaline titer, as described above. After determining total alkaline titer, destructive analysis on the polymer sheet can be performed by Inductively Coupled Plasma Emission Spectroscopy (ICP) resulting in a ppm concentration for potassium and a ppm concentration for sodium.

The alkaline titer attributable to sodium acetate is defined herein as the total alkaline titer multiplied by the ratio [ppm sodium/(ppm sodium+ppm potassium)].

The alkaline titer attributable to potassium acetate is defined herein as the total alkaline titer multiplied by the ratio [ppm potassium/(ppm sodium+ppm potassium)].

By virtue of the present invention, it is now possible to provide poly(vinyl butyral) sheet, and other polymer sheet, with superior deterioration resistance characteristics. The higher titers of sodium acetate, and sodium acetate and a magnesium salt, disclosed herein provide improved stability, particularly in environments in which the polymer sheet is exposed to high temperature and water content, without unacceptably altering the adhering qualities of the polymer sheet.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising sodium acetate in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Each reference, including journal articles, patents, applications, and books, referred to herein is hereby incorporated by reference in its entirety.

We claim:

1. A polymer sheet, comprising:
   plasticized poly(vinyl butyral);
   sodium acetate; and,
   a magnesium salt, wherein the titer of said magnesium salt is at least 4, wherein the alkalinity titer attributable to said sodium acetate is at least 20, and wherein the ratio of said titer of said magnesium salt to the total alkalinity titer is at least 0.2.

2. The polymer sheet of claim 1, wherein said alkalinity titer attributable to said sodium acetate is at least 30.

3. The polymer sheet of claim 1, wherein said alkalinity titer attributable to said sodium acetate is at least 40.

4. The polymer sheet of claim 1, wherein said alkalinity titer attributable to said sodium acetate is at least 50.

5. The polymer sheet of claim 1, wherein said titer of said magnesium salt is at least 8.

6. The polymer sheet of claim 1, wherein said titer of said magnesium salt is at least 12.

7. The polymer sheet of claim 1, wherein said ratio of said titer of said magnesium salt to said total alkalinity titer is at least 0.3

8. The polymer sheet of claim 1, wherein said ratio of said titer of said magnesium salt to said total alkalinity titer is at least 0.4

9. The polymer sheet of claim 1, wherein said magnesium salt is magnesium bis(2-ethylbutyrate).

10. A polymer sheet, comprising:
    plasticized poly(vinyl butyral);
    sodium acetate;
    potassium acetate; and,
    a magnesium salt, wherein the titer of said magnesium salt is at least 9.0, wherein the total alkalinity titer is at least 20, wherein the ratio of said titer of said magnesium salt to said total alkalinity titer is at least 0.2, and wherein the ratio of parts per million of potassium to parts per million of sodium is less than 1.0.

11. The polymer sheet of claim 10, wherein said alkalinity titer is at least 30.

12. The polymer sheet of claim 10, wherein said alkalinity titer is at least 40.

13. The polymer sheet of claim 10, wherein said alkalinity titer is at least 50.

14. The polymer sheet of claim 10, wherein said titer of said magnesium salt is at least 8.

15. The polymer sheet of claim 10, wherein said titer of said magnesium salt is at least 10.

16. The polymer sheet of claim 10, wherein said ratio of said titer of said magnesium salt to said total alkalinity titer is at least 0.3.

17. The polymer sheet of claim 10, wherein said ratio of said titer of said magnesium salt to said total alkalinity titer is at least 0.4.

18. The polymer sheet of claim 10, wherein the ratio of parts per million of said sodium to parts per million of said potassium is less than 0.8.

19. The polymer sheet of claim 10, wherein said magnesium salt is magnesium bis(2-ethylbutyrate).

20. A method of manufacturing a polymer sheet, comprising:

forming a poly(vinyl butyral) resin, wherein said resin comprises sodium acetate and a magnesium salt;

adding a plasticizer to said resin to form a melt; and, forming said polymer sheet with said melt, wherein the titer of said magnesium salt is at least 4, wherein the alkalinity titer attributable to said sodium acetate is at least 20, and wherein the ratio of said titer of said magnesium salt to the total alkalinity titer is at least 0.2.

21. A laminated glass panel, comprising:

a glass panel; and, a polymer sheet, wherein said polymer sheet comprises:

plasticized poly(vinyl butyral);

sodium acetate; and, a magnesium salt, wherein the titer of said magnesium salt is at least 4, wherein the alkalinity titer attributable to said sodium acetate is at least 20, and wherein the ratio of said titer of said magnesium salt to the total alkalinity titer is at least 0.2.

* * * * *